United States Patent [19] [11] 3,988,164
Liang et al. [45] Oct. 26, 1976

[54] CATHODE MATERIAL FOR SOLID STATE BATTERIES
[75] Inventors: C. C. Liang, Andover; L. H. Barnette, West Medford, both of Mass.
[73] Assignee: P. R. Mallory & Co., Inc., Indianapolis, Ind.
[22] Filed: Apr. 25, 1974
[21] Appl. No.: 464,085

[52] U.S. Cl. .............................. 429/191; 429/199; 429/218
[51] Int. Cl.² ...................................... H01M 35/02
[58] Field of Search............ 136/153, 155, 137, 6 R, 136/6 L, 6 LF, 20, 83 R, 100 R, 6 LN

[56] References Cited
UNITED STATES PATENTS

| | | | |
|---|---|---|---|
| 3,488,221 | 1/1970 | Shimotake et al. ................. | 136/20 |
| 3,713,897 | 1/1973 | Liang ................................. | 136/153 |
| 3,791,867 | 2/1974 | Broadhead et al. ................. | 136/6 R |
| 3,827,910 | 8/1974 | Cairns et al. ....................... | 136/6 LF |
| 3,864,167 | 2/1975 | Broadhead et al. ................. | 136/6 LN |
| 3,898,096 | 8/1975 | Heredy et al. ...................... | 136/6 F |
| 3,907,600 | 9/1975 | Pohl et al. .......................... | 136/121 |

Primary Examiner—Anthony Skapars
Attorney, Agent, or Firm—Ronald S. Cornell; Israel Nissenbaum; Charles W. Hoffmann

[57] ABSTRACT

Solid electrolyte cells comprising high-potential electrochemical anodes, solid electrolytes and metal chalcogenides selected from the group consisting of sulfides, selenides and tellurides as active cathode material.

10 Claims, 5 Drawing Figures

CATHODE MATERIAL FOR SOLID STATE BATTERIES

FIELD OF THE INVENTION

This invention relates to solid state cells and more particularly to such cells utilizing metal chalcogenides as the cathode-active material.

BACKGROUND OF THE INVENTION

Miniaturization in electronics has been rapidly advancing in recent years and has resulted in increased demand for special power sources characterized by volume and weight comparable to those of the electronic components employed in the circuitry.

Success in meeting this demand has been achieved by employing solid-state electrochemical cells since batteries of such cells permit great flexibility in design.

The solid electrolytes employed in such solid-state cells are ionic conductors which facilitate the ionic flow during the operation of the solid state cells. The performance of any given cell depends among other factors on the specific resistance of the electrolyte, the nature of the conducting species and their transport number, the temperature of the cell and the products of the cell reaction.

THE INVENTION

It is an object of the present invention to provide a cathode-active material for use with a solid electrolyte in a solid-state cell.

It is a further object of the present invention to provide a novel cathode-active material comprising materials having innate high electronic conductivity.

It is another object of the present invention to provide a solid-state cell comprising an anode, a solid electrolyte and a cathode-active material having high electronic conductivity.

It is a still further object of the present invention to provide a solid-electrolyte cell capable of using high potential anodic materials above hydrogen in the electromotive series, such as lithium, and a solid electrolyte consisting of lithium iodide, lithium hydroxide and aluminum oxide, or lithium iodide and aluminum oxide, and the aforesaid novel cathode-active materials comprising a metal chalcogenide.

Other objects of the invention will become more apparent from the following description and drawings wherein:

FIG. 1 shows a section through a solid-electrolyte cell showing the disposition of the electrodes and other cell components therein, and FIGS. 2–5 show representative discharge curves of cells constructed with the novel cathode materials of this invention.

It has been discovered that, in solid state battery systems, the presence of a metal chalcogenide in the cathode as the cathode active material serves to substantially increase the energy density of these systems.

DETAILED DESCRIPTION

The preferred solid electrolyte of this invention contains LiI, LiOH and $Al_2O_3$. This electrolyte is a practically pure ionic conductor with a conductivity ranging between $5 \times 10^{-6}$ ohm$^{-1}$ cm$^{-1}$ and $5 \times 10^{-5}$ ohm$^{-1}$ cm$^{-1}$ at ambient or room temperature. The electrolyte is more completely described in U.S. Pat. No. 3,713,897, which issued January 30, 1973.

The conductivity of the electrolyte thus formed and compressed into a pellet under a pressure of 50,000 psi, at 25° C, is $1-5 \times 10^{-5}$ ohm$^{-1}$ cm$^{-1}$. The density of the pellet formed at 50,000 psi is 3.3 g./cc.

The solid electrolyte cell according to this invention is shown in section in FIG. 1 wherein anode 1 is a lithium metal disc, and electrolyte 2 is a compressed pellet of the electrolyte. Cathode 3 is a compressed mixture of the aforesaid cathode active material.

Opposed on the outer side of their respective electrodes 1 and 3 are current collectors 4 and 5. The anode 4 and cathode 5 current collectors serve as the terminals for the cell. It is preferred that the anode 1 be confined by anode-retaining ring 6. The entire cell is insulated by insulating cell wall 7. This cell wall is preferably a polymeric material shrunk fit around the periphery of the assembled cell.

The test cell exemplified in FIG. 1 was made according to the following procedure: The electrolyte layer 2 was formed in a steel die at a pressure of about 10,000 psi. The cathode mix powder 3 was spread on one side of the electrolyte layer 2 and the cathode current collector 5 was placed on the cathode 3. This assembly was pressed under a pressure of 50,000 to 100,000 psi. On the other side of the electrolyte layer 2, a lithium anode disc 1 was positioned inside an anode-retaining ring 6 and the anode current collector 4 was placed on the lithium anode 1. This entire assembly was compressed at a pressure of 25,000 to 50,000 psi to form the electrochemical cell assembly. The periphery of the cell assembly was then insulated by shrinkfitting a tube of heat-shrinkable polymer such as ethylcellulose. Leads (not shown) were soldered to the respective anode and cathode current collectors.

ANODIC MATERIALS

The anode materials for the cells of this invention can be any of the commonly used anodic metals. However, preferred are those anodic metals which have a high EMF and have a high energy/weight ratio. Preferred among these are the light metals capable of displacing hydrogen from water, i.e. those which are above hydrogen in the electrochemical series. Such metals include aluminum, lithium, sodium and potassium, with lithium being preferred. The invention shall be described using lithium as the preferred anode active material.

CATHODE MATERIALS

The cathode active materials of this invention are the metal higher chalcogenides. The term higher chalcogenides as herein used refers to the sulfides, selenides and tellurides of certain metals. Particularly useful for this invention are the chalcogenides of lead, silver, copper, tin, iron, nickel, antimony, arsenic, molybdenum and bismuth. A particularly useful feature of these metal chalcogenides is the fact that most of them possess sufficient electronic conductivity so that cathodes constructed therefrom do not need to have added additional electronically conductive material such as metal powders in order to provide initial conductivity for the cathode. However, the addition of such metal powders and other electronically conductive materials is not excluded since the performance of cells containing such materials is improved, particularly at low temperatures.

The invention will be more specifically described by reference to the following examples. These examples are merely representative of the various cells which can be constructed according to this invention. The invention is not to be limited by the specific disclosure of the individual cells therein. These are merely test cells and the data given therein refers to the performance of such cells under the test conditions set forth therein.

EXAMPLE 1

Li/LLA 412/Ag$_2$S solid electrolyte cell

Anode: Li metal, 1.47 cm$^2$

Electrolyte: LiI: LiOH: Al$_2$O$_3$ = 4:1:2 weight proportions (LLA 412)

Cathode: A mixture of Ag$_2$S, Ag and the electrolyte as follows:

Ag$_2$S: 63.5 wt.%; Ag: 3.2 wt.%: LLA electrolyte: 33.3 wt.%

Anode current collector: 1 mil thick steel disc, 1.8 cm$^2$.

Cathode current collector: 1 mil thick Ag disc, 1,8 cm$^2$.

The cell is assembled as described in Example 1.

The test cell has an open circuit voltage (OCV) of 2.05 ± 0.05V at room temperature. A typical discharge curve is shown in FIG. 2.

EXAMPLE 2

Li/LiI/Ag$_2$S cell

This test cell is similar to those in Example 1. The electrolyte is LiI containing 2 mol % CaI$_2$, and the cathode is a mixture of Ag$_2$S (50 wt.%) and LiI (CaI$_2$ doped) (50 wt.%). In order to demonstrate that no additional electronic conductor is needed when an electronically conductive cathode-active material such as Ag$_2$S, PbS or Cu$_2$S and similar higher chalcogenides are used in the cathode mixture no Ag powder is used in the cathode mixture. The chalcogenide is not only the active depolarizer, but also the electronic conductor facilitating the electronic flow during discharge.

The open circuit voltage of this test cell is 2.05 volts, similar to that in Example 2. FIG. 3 shows the discharge curves of this test cell at 37° C.

EXAMPLE 3

Li/LLA 412/PbS cell

The cathode active mixture of this test cell contains 47 wt.% PbS, 23 wt.% Pb and 30 wt.% LLA electrolyte; OCV = 1.9V at room temperature.

EXAMPLE 4

Li/LLA 412/Cu$_2$S cell

The cathode active mixture of this test cell contains 40 w% CuS, 27 w% Cu and 33 w% LLA electrolyte; OCV = 2.1 ± 0.1V.

EXAMPLE 5

Li/LLA 412/PbSe

The cathode mixture of this test cell contains PbSe 60 wt.%, Pb 10 wt.%, and 30 wt.% of LLA 412 electrolyte; OCV = 1.9V at room temperature.

EXAMPLE 6

Li/LLA-412/PbTe

The cathode mixture of this test cell contains PbTe 60 wt. %, Pb 10 wt. %, and 30 wt. % of LLA 412 electrolyte; OCV = 1.9V at room temperature.

EXAMPLE 7

Li/LLA-412/Sb$_2$S$_3$

The cathode mixture of this test cell contains Sb$_2$S$_3$ 40 wt. %, Sb 30 wt. % and 30 wt. % of LLA 412 electrolyte. OCV = 2.0 ± 0.1V at room temperature.

EXAMPLE 8

Li/LLA-412/MoS$_2$

The cathode mixture of this test cell contains MoS$_2$ 60 wt. %, Mo 10 wt. %, and 30 wt. % of LLA 412 electrolyte. OCV = 1.70V at room temperature.

EXAMPLE 9

Li/LLA-412/Bi$_2$S$_3$

The cathode mixture of this test cell contains Bi$_2$S$_3$ 40 wt. %, Bi 30 wt. %, and 30 wt. % of LLA 412 electrolyte. OCV = 2.0 ± 0.1V at room temperature.

EXAMPLE 10

Li/LLA-412/SnTe

The cathode mixture of this test cell contains SnTe 40 wt. %, Sn 30 wt. %, and 30 wt. % of LLA 412 electrolyte. OCV = 1.9 ± 0.1V at room temperature.

EXAMPLES 11

Test cells prepared according to Example 1, but utilizing the mixtures of chalcogenides set forth below, showed the noted open circuit voltages:

| Cathode-Active Mixture | Wt. Ratio | OCV |
| --- | --- | --- |
| PbS + Sb$_2$S$_3$ | 1:1 | 2.05 (FIG. 4) |
| PbS + PbSe + PbTe | 1:1:1 | 1.90 |
| PbTe + Sb$_2$S$_3$ | 1:1 | 2.05 |
| Sb$_2$S$_3$ + Sb$_2$Te$_3$ | 2:1 | 2.05 (FIG. 5) |
| MoS$_2$ + PbS | 2:1 | 1.90 |
| As$_2$S$_3$ + Sb$_2$S$_3$ | 1:1 | 2.05 |
| MoS$_2$ + Sb$_2$S$_3$ | 1:1 | 2.05 |
| PbS + PbSe | 1:1 | 1.90 |
| PbTe + SnTe | 1:1 | 1.95 |
| Sb$_2$Te + PbTe | 1:1 | 1.90 |

Figure 1:
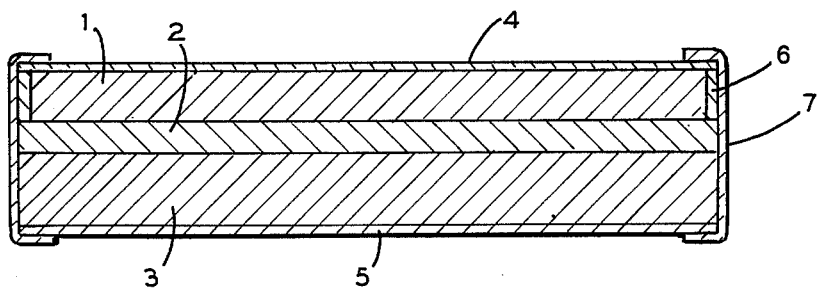
Figure 2:
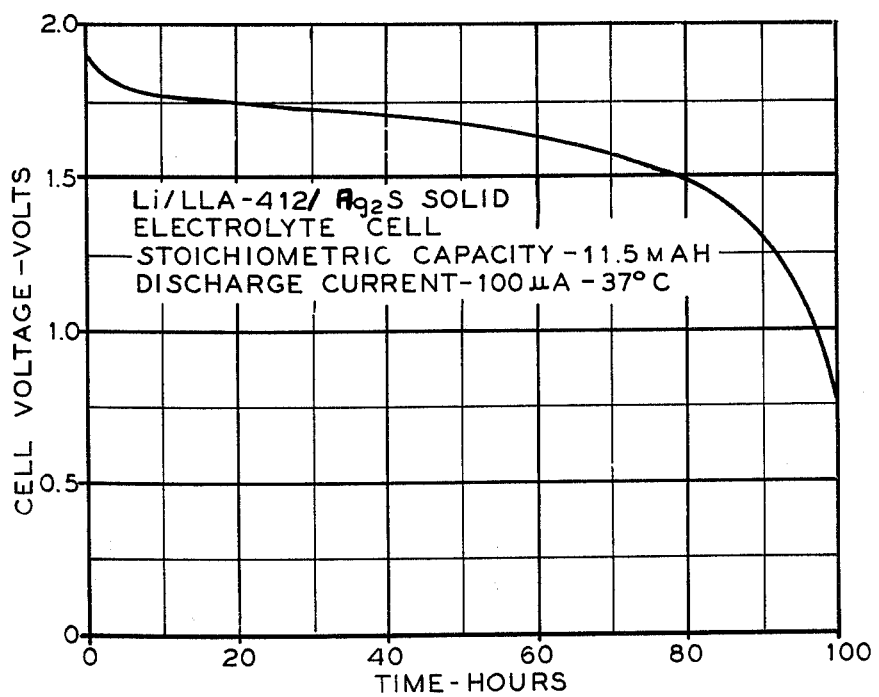
Figure 3:
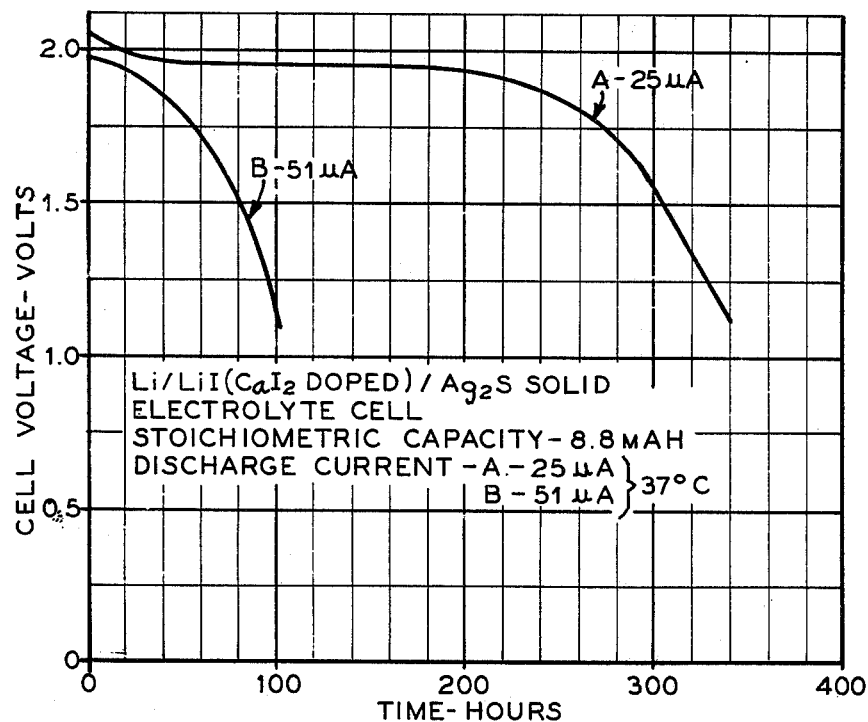
Figure 4:
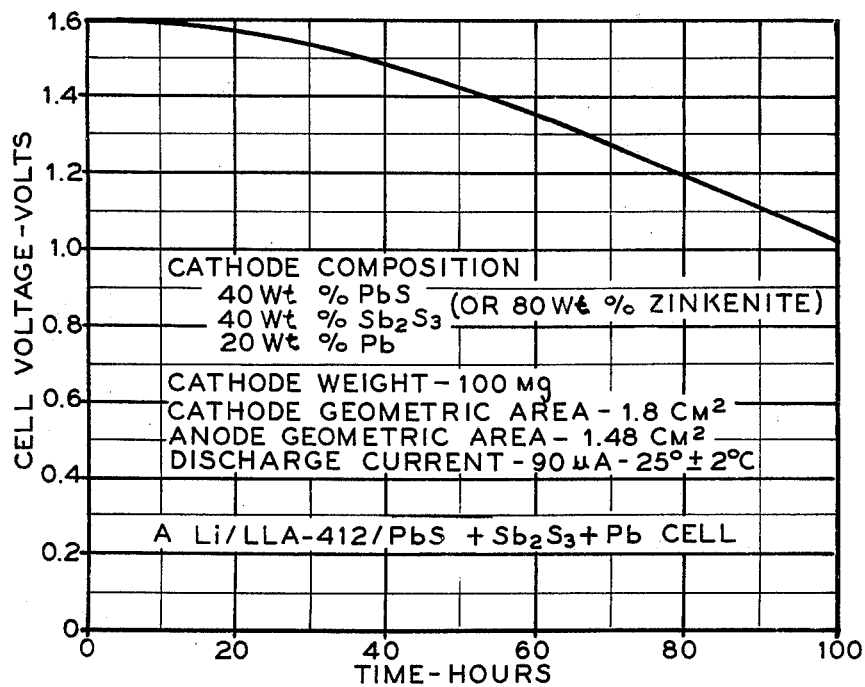
FIG. 4 is the discharge curve of the PbS + Sb$_2$S$_3$ Cathode-Active Mixture System described above.
Figure 5:
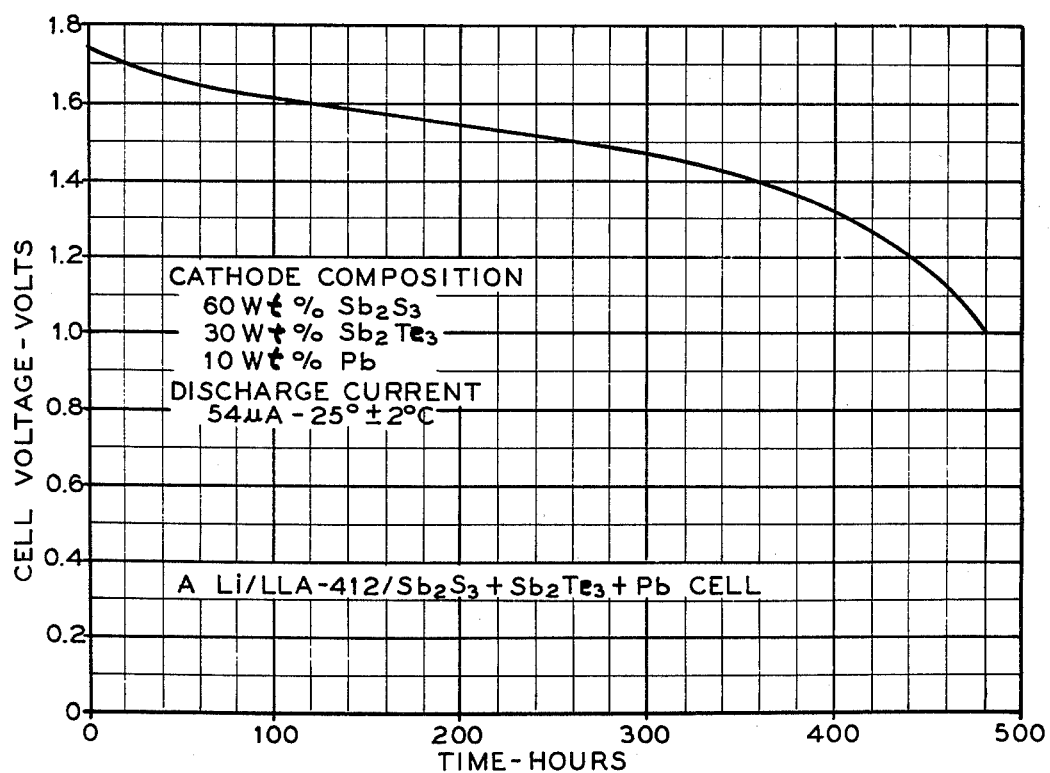
FIG. 5 is the discharge curve of the Sb$_2$S$_3$ + Sb$_2$Te$_3$ Cathode-Active Mixture System also described above.

What is claimed is:

1. A solid state electrochemical cell comprising an anode which is a metal above hydrogen in the electromotive series, a solid electrolyte chemically compatible with said anode, and a cathode comprising one or more metal chalcogenides as cathode active material, said cell being adapted to be operable at room temperature.

2. The cell according to claim 1 wherein said chalcogenides are selected from the sulfides, selenides and tellurides of metals selected from the group consisting of lead, silver, copper, tin, arsenic, antimony, iron, nickel, molybdenum and bismuth.

3. The cell according to claim 2 wherein the metal sulfides are Ag$_2$S, PbS, Cu$_2$S, As$_2$S$_3$, Bi$_2$S$_3$, Sb$_2$S$_3$, MoS$_2$ and FeS$_2$.

4. The cell according to claim 1 wherein cathode-active material is the sole electronic conductor of said cathode.

5. The cell according to claim 1 wherein said cathode includes a metallic electronic conductor.

6. The cell according to claim 1 wherein said solid electrolyte comprises lithium iodide, lithium hydroxide and aluminum oxide.

7. The cell according to claim 1 wherein said solid electrolyte comprises lithium iodide and aluminum oxide.

8. The cell according to claim 1 wherein said cathode includes and has dispersed therein solid electrolyte material in intimate contact with said cathode-active material.

9. A cell according to claim 1 wherein said anode is lithium.

10. A cell according to claim 6 wherein said anode is lithium.

* * * * *